United States Patent [19]

Makhlouf et al.

[11] 4,425,468

[45] Jan. 10, 1984

[54] POLYUREA-POLYURETHANE ACRYLATE POLYMER DISPERSIONS

[75] Inventors: Joseph M. Makhlouf, Mars; Gregory J. McCollum, Glenshaw; Paul R. Kerr, Allison Park, all of Pa.

[73] Assignee: PPG Industries, Inc., Pittsburgh, Pa.

[21] Appl. No.: 336,226

[22] Filed: Dec. 31, 1981

[51] Int. Cl.$^3$ .................. C08G 18/12; C08G 18/32
[52] U.S. Cl. .................. 524/710; 524/840; 525/440; 525/455; 525/459; 525/920; 526/75; 528/75
[58] Field of Search .................. 525/455, 920, 459; 526/75; 528/75; 524/710, 840

[56] References Cited

U.S. PATENT DOCUMENTS

| | | | |
|---|---|---|---|
| 3,297,745 | 1/1967 | Fekete et al. | 260/471 |
| 3,325,421 | 6/1967 | Muller | 252/308 |
| 3,360,495 | 12/1967 | Muller et al. | 260/33.2 |
| 3,457,326 | 7/1969 | Kienle | 260/858 |
| 3,499,852 | 3/1970 | Schroeder et al. | 260/18 |
| 3,509,234 | 8/1965 | Burlant et al. | 260/859 |
| 3,641,199 | 2/1972 | Niederhauser et al. | 260/859 R |
| 3,645,976 | 2/1972 | Suzuki et al. | 260/75 NH |
| 3,682,861 | 8/1972 | Radimann et al. | 260/47 CB |
| 3,700,643 | 10/1972 | Smith et al. | 260/77.5 AN |
| 3,772,404 | 11/1973 | Knight et al. | 260/859 R |
| 3,783,152 | 1/1974 | Larsen | 260/471 C |
| 3,850,770 | 11/1974 | Juna et al. | 204/159.19 |
| 3,864,133 | 2/1975 | Hisamatsu et al. | 96/115 P |
| 3,873,640 | 3/1975 | Owston et al. | 260/859 R |
| 3,878,036 | 4/1975 | Chang | 428/424 |
| 3,903,032 | 9/1975 | Matsuda et al. | 260/29.2 TN |
| 3,907,751 | 9/1975 | Knight et al. | 260/47 UA |
| 3,917,570 | 11/1975 | Chang et al. | 260/75 TN |
| 3,939,126 | 2/1976 | Carder et al. | 260/77.5 CR |
| 3,951,897 | 4/1976 | Matsuda et al. | 260/29.2 TN |
| 4,093,569 | 6/1978 | Reischl et al. | 260/2.5 AM |
| 4,097,439 | 6/1978 | Darling | 260/31.2 N |
| 4,108,840 | 8/1978 | Friedlander | 528/46 |
| 4,129,641 | 12/1978 | Ferrarini | 525/455 |
| 4,153,776 | 5/1979 | Friedlander et al. | 528/49 |
| 4,184,990 | 1/1980 | Reischl et al. | 260/29.2 TN |
| 4,187,366 | 2/1980 | Friedlander et al. | 528/75 |
| 4,208,507 | 6/1980 | Stutz et al. | 528/64 |
| 4,223,099 | 9/1980 | von Harpe et al. | 525/126 |
| 4,223,114 | 9/1980 | Siling | 525/455 |
| 4,232,133 | 11/1980 | Ferrarini | 525/455 |
| 4,254,176 | 3/1981 | Muller et al. | 428/220 |
| 4,283,500 | 8/1981 | Armstrong et al. | 521/137 |
| 4,300,886 | 11/1981 | Suline | 525/455 |
| 4,305,857 | 12/1981 | Reischl | 260/29.2 TN |
| 4,305,858 | 12/1981 | Reischl | 260/29.2 TN |

FOREIGN PATENT DOCUMENTS 2404239  1/1974  Fed. Rep. of Germany.

OTHER PUBLICATIONS

Spitler and Lindsey, "PHD Polyols, A New Class of PUR Raw Materials", Journal of Cellular Plastics, Jan.-/Feb. 1981.

*Primary Examiner*—Wilbert J. Briggs, Sr.
*Attorney, Agent, or Firm*—Linda Pingitore; William J. Uhl

[57] ABSTRACT

Polymerizable ethylenically unsaturated urea-urethane polymer dispersions are prepared. In preparing the dispersions a polyisocyanate, at least a portion of which is diisocyanate, is contacted with a polyfunctional amine containing primary and/or secondary amino groups in the presence of:

(a) a polyol, at least a portion of which is a polymeric polyol, free of ethylenic unsaturation,
(b) a diluent which is an ethylenically unsaturated compound free of active hydrogens, and
(c) an active hydrogen-containing polymerizable ethylenically unsaturated compound, the equivalent ratio of isocyanate to active hydrogen in said polyol and said polyfunctional amine being within the range of 1.1 to 2.0/1 and the equivalent ratio of polyol to polyfunctional amine being within the range of 0.75 to 20/1, under conditions sufficient to form a polymerizable ethylenically unsaturated urea-urethane compound dispersed in the polymerizable ethylenically unsaturated compound. The dispersions are useful in the formulation of in-mold coating compositions and injection molding compositions.

39 Claims, No Drawings

POLYUREA-POLYURETHANE ACRYLATE POLYMER DISPERSIONS

BACKGROUND OF THE INVENTION

The present invention relates to polyurea-polyurethane acrylate polymer dispersions; their method of preparation and their use in coating and molding applications.

It has been known heretofore that the utilization of acrylate terminated urethane polymers in coating and molding compositions results in exceptional coating performance properties such as, for example, a unique combination of hardness and flexibility, abrasion resistance, solvent resistance, good application and adhesion properties and good final film appearance. Moreover, it has also been generally known that the presence of urea groups in polyurethane polymers further adds to the already excellent properties described above, for example, impact resistance, tear resistance, thermal stability and enhancement of the combination of hardness and flexibility. However, whereas, it is predominantly desirable to introduce urea groups into a urethane polymer system, depending upon the mode of introduction of these groups, they can result in disadvantageous properties in the final polymer.

Usually, urea-linked urethane polymers are formed by the use of an amine functional group-containing compound at the urea-forming step. For example, U.S. Pat. No. 4,097,439 discloses a process in which a diisocyanate is reacted first with a diol to form an isocyanate-terminated urethane followed by chain extension with a diamine and end-capping with hydroxyl-containing acrylate to form a urethane-urea acrylate polymer. German Pat. No. 2,404,239 is also directed to a polyurethane-polyurea resin formed from the reaction of a polyisocyanate with a polyol to form a polyurethane prepolymer which contains isocyanate groups, and then reacting this prepolymer with polyamine to form the resin product. Using amine-containing compounds in this manner as a device to introduce urea groups into a polymer chain has two significant effects. First the resultant polymer is prepared as a solution polymer and second there are adverse effects on the rheological properties, namely viscosity and thixotropy and markedly increased. This poses practical difficulties in coating and molding compositions such as Injection Molding wherein the molding composition is pumped from a storage receptacle to the molding machines. In areas of the pumping system where shearing forces are minimal, the composition tends to set up gel networks and solidify thus clogging the system and resulting in equipment malfunction and work delays. This phenomenom is further intensified with the use of aromatic polyisocyanates and/or ethylenically unsaturated monomeric diluents such as styrene and methyl methacrylate. There is therefore a need to produce a terminal ethylenically unsaturated urea-urethane polymer which has all of the beneficial properties described above but without the attendant rheological drawbacks.

In addition to the prior art mentioned above dealing with solution polymers, the article by Spitler and Lindsey, "PHD Polyols, A New Class of PUR Raw Materials", Journal of Cellular Plastics, January/February 1981, pages 43-50, discloses polyol dispersions which consist of particles of polyurea dispersed in a polyether polyol, the polyurea formed from the reaction of a polyisocyanate with a polyamine. Urea-urethane polyol is formed as a result of some polyol reacting with polyisocyanate followed by reaction with polyamine. These polyurea-urethane polyol dispersions, however, do not contan ethylenic unsaturation.

SUMMARY OF THE INVENTION

In accordance with the present invention, a process is disclosed for preparing a polymerizable ethylenically unsaturated urea-urethane polymer dispersed in a polymerizable ethylenically unsaturated compound. The process comprises reacting a polyisocyanate, at least a portion of which is a diisocyanate, with a polyfunctional amine containing primary and/or secondary amino groups in the presence of:

(a) a polyol, at least a portion of which is a polymeric polyol, free of ethylenic unsaturation, (b) a diluent which is an ethylenically unsaturated compound free of active hydrogens, and (c) an active hydrogen-containing polymerizable ethylenically unsaturated compound the equivalent ratio of isocyanate to active hydrogen in said polyol and said polyfunctional amine being within the range of 1.1 to 2.0/1 and the equivalent ratio of polyol to polyfunctional amine being within the range of 0.75 to 20/1, under conditions sufficient to form a polymerizable ethylenically unsaturated urea-urethane polymer dispersed in a polymerizable ethylenically unsaturated compound.

In a preferred embodiment of the present invention a two step process is used for preparing the aforesaid urea-urethane polymer dispersion. The process comprises the sequential steps of:

(a) reacting a polyisocyanate, at least a portion of which is a diisocyanate, with a polyfunctional amine containing primary and/or secondary amino groups in the presence of a polyol, at least a portion of which is a polymeric polyol, free of ethylenic unsaturation and a diluent which is an ethylenically unsaturated compound free of active hydrogens, the equivalent ratio of isocyanate to active hydrogen in said polyol and said polyfunctional amine being within the range of 1.1 to 2.0/1 and the equivalent ratio of polyol to polyfunctional amine being within the range of 0.75 to 20/1, under conditions sufficient to form a NCO group-containing polyurea-urethane dispersed in an ethylenically unsaturated compound; followed by (b) reacting the NCO group-containing polyurea-polyurethane dispersion with an active hydrogen containing polymerizable ethylenically unsaturated compound under conditions sufficient to react the NCO-functionally with the active hydrogens thereby forming the polymerizable ethylenically unsaturated urea-urethane polymer dispersion.

The present invention also relates to in-mold coating compositions and to a method of in-mold coating. The in-mold coating compositions comprise a dispersion of the following ingredients in an ethylenically unsaturated monomer:

(a) a polymerizable ethylenically unsaturated urea-urethane polymer prepared by a process which comprises:

(i) reacting a polyisocyanate, at least a portion of which is a diisocyanate, with a polyfunctional amine containing primary and/or secondary amino groups in the presence of a polyol, at least a portion of which is a polymeric polyol, free of ethylenic unsaturation and a diluent which is an ethylenically unsaturated compound free of active hydrogens, the equivalent ratio of isocyanate to active hydrogen in said polyol and said polyfunctional amine being within the range of 1.1 to 2.0/1 and the equivalent ratio of polyol to polyfunctional amine being within the range of 0.75 to 20/1 , under conditions sufficient to form an NCO group-containing polyurea-polyurethane dispersed in an ethylenically unsaturated compound; followed by (ii) reacting the NCO group-containing polyurea-polyurethane dispersion with an active hydrogen containing polymerizable ethylenically unsaturated compound under conditions sufficient to react the NCO-functionality with the active hydrogens thereby forming the polymerizable ethylenically unsaturated urea-urethane polymer dispersion (b) a catalyst, and (c) a mold release agent;

said coating composition capable of being applied to the outer surface of a molded article while still in the mold such that when the mold is closed and sufficient pressure applied the coating composition substantially and uniformly covers and penetrates the article surface.

The method of in-mold coating comprises:

(a) placing on the outer surface of said article in a mold a charge of a curable thermosetting coating composition, such as set forth immediately above, said charge being sufficient to provide on said surface a coating having a thickness of less than about 20 mils;

(b) applying sufficient pressure to said charge to cause the coating composition to substantially and uniformly cover and penetrate said surface;

(c) curing said coating composition in said mold under heat and pressure to bond said coating composition to said surface; and (d) removing said coated article from said mold, providing said article with a substantially smooth defect-free crosslinked polyurea-urethane based coating bonded to said surface of said article.

The present invention also reates to molding compositions and to a method of molding. The molding compositions comprise a dispersion of the following ingredients in an ethylenically unsaturated monomer:

(a) a polymerizable ethylenically unsaturated urea-urethane polymer prepared by a process which comprises:

(i) reacting a polyisocyanate, at least a portion of which is a diisocyanate, with a polyfunctional amine containing primary and/or secondary amino groups in the presence of a polyol, at least a portion of which is a polymeric polyol, free of ethylenic unsaturation and a diluent which is an ethylenically unsaturated compound free of active hydrogens, the equivalent ratio of isocyanate to active hydrogen in said polyol and said polyfunctional amine being within the range of 1.1 to 2.0/1 and the equivalent ratio of polyol to polyfunctional amine being within the range of 0.75 to 20/1 , under conditions sufficient to form an NCO group-containing polyurea-polyurethane dispersed in an ethylenically unsaturated compound; followed by (ii) reacting the NCO group-containing polyurea-polyurethane dispersion with an active hydrogen containing polymerizable ethylenically unsaturated compound under conditions sufficient to react the NCO-functionality with the active hydrogens thereby forming the polymerizable ethylenically unsaturated urea-urethane polymer dispersion, (b) a mold release agent, and (c) reinforcements;

said molding composition capable of being injected into a mold in a smooth even flow and cured therein.

The method of molding comprises:

(a) depositing in a mold a charge of thermosetting molding composition, such as set forth immediately above. said charge being sufficient to substantially fill the mold;

(b) heating the charge while in the mold so to cure it and form a thermoset article;

(c) removing the article from the mold.

The polymers of the present invention are readily distinguished from the art-recognized polymers discussed previously. The polyurea-polyurethane polyol dispersions disclosed in the Journal article cited above are not ethylenically unsaturated as are the polymers of the present invention. The lack of unsaturation restricts the use to which the polymers can be applied. The polymers of the present invention are also distinguished from the acrylate terminated urethane-urea polymers of aforementioned U.S. Pat. No. 4,097,439 and German Pat. No. 2,404,239 in that they are dispersion polymers having low viscosity and thixotropy rather than high viscosity, high thixotropy solution polymers disclosed in the references. Moreover, these art-recognized polymers are generally the result of a sequential reaction; that is, the polyisocyanate is reacted first with a diol to form a urethane prepolymer, then chain extended with a diamine, and finally end-capped with acrylate. The process for making the polymers of the present invention is distinguished from the aforedescribed art-recognized process in that it is not strictly a sequential process. Rather a polyisocyanate is reacted with a polyfunctional amine in the presence of polyol free of ethylenic unsaturation, resulting in the formation of a dispersed polymer and better viscosity control. The dispersion polymers of the present invention, therefore, have all of the excellent performance properties associated with urea-urethane polymers but in addition they also have excellent rheological properties making them especially appropriate for molding applications.

DETAILED DESCRIPTION OF THE INVENTION

As stated above, the polyurea-polyurethane dispersion polymers of the present invention comprise the reaction product of the following essential ingredients: a polyisocyanate, a polyfunctional amine, a polyol free of ethylenic unsaturation, a diluent, and an active hydrogen-containing polymerizable ethylenically unsaturated compound.

The polyisocyanate component can be an aliphatic polyisocyanate, including a cycloaliphatic polyisocyanate or an aromatic polyisocyanate; preferably a diisocyanate is employed. Useful aliphatic diisocyanates include ethylene diisocyanate, 1,2-diisocynatopropane, 1,3-diisocyanatopropane, 1,6-diisocyanatohexane, 1,4-butylene diisocyanate, 1,6-hexamethylene diisocyanate, lysine diisocyanate, 1,4-methylene bis(cyclohexyl isocyanate) and isophorone diisocyanate. Useful aromatic diisocyanates include toluene diisocyanate, meta-xylene-diisocyanate, para-xylene-diisocyanate, 4-chloro-1,3-phenylene diisocyanate, 1,5-tetrahydronaphthalene diisocyanate, 4,4'-dibenzyl diisocyanate 1,2,4-benzene triisocyanate.

The polyfunctional amine component contains primary and/or secondary amino groups; it can be a compound which is monofunctional with respect to amine and which has active hydrogen in addition to the amine hydrogens; e.g., hydroxyl groups. Preferably the polyfunctional amine is a polyamine, more preferably a diamine and preferably the polyfunctional amine is cyclic. More preferably the polyfunctional amine is a cyclic diamine. Useful polyfunctional amines include monoethanolamine, an ammonia-hydroxyethyl acrylate adduct, m-phenylene-diamine, propylenediamine, ethylenediamine, diethylenetriamine, toluenediamine, isophoronediamine, N-methyl 1,3-propane diamine, poly(propylene ether)dimine and N,N'-dicyanoethyl poly(propylene ether) diamine; preferably isophoronediamine is utilized. The polyfunctional amine preferably has a molecular weight within the range of 60 to 2000, more preferably 60 to 1000, the molecular weight being determined on a number average base.

Exemplary of the polyol component useful in preparing the claimed dispersion polymers are polymeric polyols, that is those having a molecular weight of 500 or more, preferably 500 to 5000, on a number average basis and low molecular weight polyols, that is those having a molecular weight of 250 or less, preferably 62 to 250. Although it has been specified that the molecular weight of the polymeric polyol can be 500 or more, and the low molecular weight polyol less than 250, it should be appreciated that polyols having molecular weights within these limits can also be used. Broadly speaking, the molecular weight of the polyol component should range from about 62 to 5000, the molecular weight being determined on a number average basis.

Examples of the low molecular weight polyols are propylene glycol, 1,4-butane diol, dipropylene glycol, trimethylolmethane, trimethylolpropane, trimethylolethane, pentaerythritol, dipentaerythritol, glycerol, and substituted polyols such as monoallyl glycerol. Examples of the polymeric polyols are polyether diols and polyesterdiols such as polypropylene glycol, polybutylene glycol, polyethylene glycol, and polycaprolactone diol. Preferably the polyol is a diol. Mixtures of the aforesaid polyols may also be utilized. In a preferred embodiment polybutylene glycol either alone or in admixture with polyethylene glycol and/or polypropylene glycol is utilized.

Examples of the active hydrogen-containing ethylenically unsaturated compound are a hydroxyalkyl acrylate or methacrylate. Suitable compounds include 2-hydroxyethyl acrylate, 2-hydroxyethyl methacrylate, 2-hydroxypropyl acrylate, 3-hydroxypropyl acrylate, 2-hydroxypropyl methacrylate, 3-hydroxypropyl methacrylate and the like. Preferably, 2-hydroxyethyl acrylate and 2-hydroxyethyl methacrylate are utilized.

The diluent is used to reduce the concentration of the polyurea-polyurethane polymer dispersion. Generally, any conventional diluent can be utilized herein although typically the diluent is an ethylenically unsaturated compound free of active hydrogens. Examples of the ethylenically unsaturated compound free of active hydrogens are those selected from the group consisting of vinyl aromatic compounds and alkylacrylates or methacrylates. Suitable compounds include styrene, vinyl toluene, methyl acrylate, ethyl acrylate, propyl acrylate, isopropyl acrylate, butyl acrylate, hexyl acrylate, 2-ethylhexyl acrylate, methyl methacrylate, ethyl methacrylate, propyl methacrylate, butyl methacrylate and 2-ethyl-hexyl methacrylate. Preferably, styrene, methyl methacrylate, and butyl methacrylate are utilized.

It should be understood that, although each of the reactive components in the process for preparing the aforedescribed polyurea-polyurethane dispersion polymers has been discussed separately, the present invention also contemplates the use of a single compound having the functionality of the polyol free of ethylenic unsaturation and the active hydrogen-containing polymerizable ethylenically unsaturated compound. An example of such a compound is glycerol monoacrylate.

The particle size of the polymer dispersions of the present invention can be determined from transmission light scattering measurements and application of the Mie Light Scattering Theory. A detailed discussion of this method can be found in P. E. Pierce and C. E. Cowan, "Measurement of Particle Size of Anionic Electrodeposition Resin Micelles and Factors Which Influence Micelle Size," Journal of Paint Technology, Vol. 44, No. 568, pages 61–67, May 1972 and also E. A. Collins, J. A. Davidson, and C. A. Daniels, "Review of Common Methods of Particle Size Measurement," Journal of Paint Technology, Vol. 47, No. 604, pages 35–56, May 1975. When the percent light transmittance is controlled to within the range of from about 20 percent to about 90 percent, the particle size of the dispersion broadly falls within the range of from about 200 Angstroms to about 3000 Angstroms. The majority of the particles, however, are within the range of from about 400 Angstroms to about 600 Angstroms.

The dispersions of the present invention can also be characterized vby their opaqueness which is characteristic of a dispersion. Moreover, the dispersions of the present invention exhibit a noticeable lack of thixotropy which further distinguishes them over solution polymers. In a preferred embodiment the aforesaid dispersions can be further characterized in that when one percent by weight of a polar solvent such as dimethylformamide is added to the dispersion, the viscosity of the dispersion increases. This distinguishes the dispersion from solution polymers in which the addition of a polar solvent would cause a viscosity decrease.

The dispersion polymers of the present invention can be represented by the following structural formula:

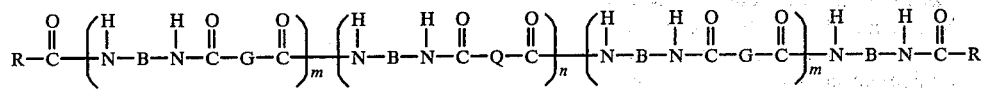

wherein:
R is the radical derived from a polymerizable active hydrogen-containing ethylenically unsaturated compounds as mentioned above.
G is a bivalent organic radical derived from the removal of terminal hydrogen groups from a polyol free of ethylenic unsaturation, such as those mentioned above, having a molecular weight between 62 and 5000.
Q is a bivalent organic radical derived from removal of terminal hydrogen groups from a polyfunctional amine, such as those mentioned above, containing primary and/or secondary amino groups having a molecular weight between 60 and 2000.

B is a bivalent organic radical derived from removal of terminal isocyanate groups from an organic polyisocyanate such as those mentioned above.

On an average basis $m = 0.75$ to 10 and $n = 1$.

The polymerizable ethylenically unsaturated urea-urethane polymer dispersions of the present invention can be prepared in a one step reaction in the following manner. A polyisocyanate is contacted with a polyfunctional amine containing primary and/or secondary amino groups in the presence of a polyol free of ethylenic unsaturation, a diluent, and an active hydrogen-containing polymerizable ethylenically unsaturated compound under conditions sufficient to form a polymerizable ethylenically unsaturated urea-urethane polymer dispersed in the polymerizable ethylenically unsaturated compound.

Preferably the dispersion polymers described above are prepared in a two step reaction; for example, in the first step the polyisocyanate is contacted with the polyfunctional amine in the presence of the polyol free of ethylenic unsaturation and the diluent under conditions sufficient to form a NCO-group containing polyurea-polyurethane dispersed in an ethylenically unsaturated compound. In the second step, the active hydrogen-containing ethylenically unsaturated compound is contacted with the NCO-group containing dispersion polymer formed in the first step to end-cap the polymer with polymerizable ethylenic unsaturation. Preferably, a portion of the active hydrogen-containing ethylenically unsaturated compound is present in the first step and a portion of the polyol free of ethylenic unsaturation is present in the second step. Under this type of procedure problems with viscosity variation and foaming as a result of contamination with water can be controlled. By prereacting about three-fourths of the active hydrogen-containing ethylenically unsaturated compound, prior to forming the dispersion a portion of the diisocyanate is initially capped at one end to better control chain length. In a further preferred embodiment the polyfunctional amine and polyol are premixed before being contacted with the polyisocyanate. Moreover, some polyol can be withheld during the dispersion forming step and added prior to completion of end-capping for viscosity adjustment. Low viscosity resins can readily be produced in this manner.

It should be understood that although the disclosure has focused on a detailed discussion of particular embodiments of both the one-step and two-step reactions, the invention is not to be thusly limited. Rather, other equivalent embodiments are contemplated by the present invention and fall within the scope of the claims. For example, in one embodiment polyisocyanate, polyfunctional amine, polyol free of ethylenic unsaturation, and diluent are reacted to form a hydroxyl rich prepolymer which is reacted with additional polyisocyanate prior to end-capping with active hydrogen-containing ethylenically unsaturated compound.

In preferred embodiments of both the one-step and two-step reactions, the ethylenic unsaturation in the resultant polymerizable ethylenically unsaturated ureaurethane polymer is in the terminal position.

The polymer is usually present in the active hydrogen-free ethylenically unsaturated dispersion medium to the extent of about 25 percent to about 80 percent resin solids. The amount of polymer forming reactants utilized in preparing the claimed polymers can vary, but generally the equivalent ratio of isocyanate to active hydrogen in the polyol and polyfunctional amine is within the range of 1.1 to 2.0/1, and the equivalent ratio of polyol to polyfunctional amine is within the range of 0.75 to 20/1. Preferably, the equivalent ratio of isocyanate to active hydrogen and combined polyol and polyfunctional amine is within the range of 1.2 to 1.4/1; the preferred equivalent ratio of polyol to polyfunctional amine is within the range of 1 to 15/1. Other ingredients are typically utilized with the polymer forming components described above, such as free radical inhibitors to prevent premature reaction of the ethylenically unsaturated compound and catalyst to accelerate the reaction between polyol and polyisocyanate. These materials are typically present in small amounts, generally from about 0.01 percent to about 1 percent by weight.

The dispersions of the present invention are useful in molding applications such as injection molding and in the formulation of in-mold coatings. In-mold coating compositions are applied to the outer surface of molded articles to cover surface defects such as sink marks, porosity, microcracks and open knit lines. In-mold coatings generally must possess certain characteristics. Among these, the compound must be able to flow under pressure to cover the article completely with a uniform skin. The viscosity must not be low enough, however, that the compound will be squeezed out of the mold during the press closing. Particularly, the composition must have the ability to form a film that adheres well to a fiber glass reinforced substrate even with no prior treatment of the substrate surface; this must be so even if the substrate has defects or is damaged. Also, the cured coating must release easily from the chromed surfaces of the mold. The in-mold coating compositions of the present invention are especially useful in all these respects.

The in-mold coating compositions of the present invention are formulated by combining a catalyst and a mold release agent to the dispersion polymers as described above. The coating composition must be capable of being applied to the outer surface of a molded article while still in the mold such that when the mold is closed and sufficient pressure applied the coating composition substantially and uniformly covers and penetrates the article surface.

The dispersion medium for the in-mold coating composition is the ethylenically unsaturated monomer selected from those mentioned above. Suitable monomers include styrene, alpha-methyl styrene, vinyl toluene, and methyl methacrylate. Preferably a vinyl aromatic compound such as styrene is utilized. The ethylenically unsaturated monomer is usually present in amounts of from about 5 to 50 percent by weight based on total weight of the coating composition.

The polymerizable ethylenically unsaturated urea-urethane polymer has been discussed in detail above therefore no further discussion will be given here. The urea-urethane polymer is present in amounts of from about 5 to about 50 percent by weight, preferably 10 to 40 percent by weight based on total weight of the composition.

These are many catalysts which are conventionally utilized in molding compositions and one generally can use any number of these. Typically, a free radical generating catalyst such as peroxide is utilized to catalyze the crosslinking reaction. Examples of free radical catalysts include tertiary butyl perbenzoate, tertiary butyl peroctoate, methyl ethyl ketone peroxide, and mixtures thereof. Preferred catalysts are tertiary butyl perbenzoate, tertiary butyl peroctoate, and mixtures thereof. The free radical generating catalyst is present in minor amounts, usually about 0.5 to 3 percent by weight based on total weight of the composition.

The mold release agent is a common additive under standard molding practice. It functions as an exteral lubricant so that after molding is completed and the mold is opened the coated article can be removed readily with a minimum of handling and therefore a reduced incidence of scratching or abrasion. There are many types of mold release agents conventionally used in molding compounds and one generally can use any number of these. Examples of suitable materials include zinc stearate, the natural product lethicin and DuPont's ZELEC UN aliphatic phosphate; preferably ZELEC UN is utilized.

In one embodiment the in-mold coating composition additionally contains a pigment. The pigment component is added in amounts of from 0 percent to about 80 percent by weight, preferably 10 to 40 percent by weight based on the total weight of the composition. Preferably an electroconductive pigment, such as conductive carbon black is used to impart conductivity to the in-mold coating. This facilitates the use of electrostatically applied coating compositions over the in-mold coating. Although the use of an electroconductive pigment is preferred, a nonconductive in-mold coating can be produced with the use of conventional nonconductive inorganic pigments. Useful pigments include titanium dioxide, silica, iron oxides, talc, mica, clay, carbon black, zinc oxide, lead chromate and calcium carbonate. If desired organic pigments can also be utilized.

In a preferred embodiment, the in-mold coating composition of the present invention additionally contains an ethylenically unsaturated polyurethane which is free of urea linkages formed by reacting an active hydrogen-containing unsaturated compound, a polyester polyol, and a polyisocyanate. This polyurethane functions as a flexible crosslinking monomer. Examples of suitable polyisocyanates and active hydrogen-containing unsaturated compounds include those mentioned above in connection with the preparaton of the urea-urethane polymers.

Examples of suitable polyester polyols include those formed by the esterification of polyols with polycarboxylic acids including acid anhydrides. The polyols conventionally employed in making the polyester polyols include alkylene glycols such as ethylene glycol, propylene glycol, and neopentyl glycol and glycols such as cyclohexanedimethanol and polyether glycols, e.g., poly(oxytetramethylene) glycol. Mixtures of glycols can also be used. Suitable polycarboxylic acids include isophthalic acid, phthalic anhydride, adipic acid and azaleic acid. Polyester polyols can also be made from the reaction of a lactone with an alcohol or polyol. The lactones commercially available are represented by the structure:

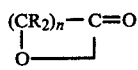

where n is from 2 to 9 and the R's are hydrogen, alkyl, cycloalkyl, alkoxy and single ring aromatic hydrocarbon radicals. Preferred lactones are epsilon-caprolactones where n=5. Examples of polyols are those described above. Also, the active hydrogen-containing ethylenically unsaturated compound can be used to ring open the lactone and form the polyester.

In a one embodiment the aforesaid polyurethane crosslinker is produced from 2-hydroxyethyl methacrylate (HEMA), epsilon-caprolactone, and toluene diisocyanate at a mole ratio of 1:3:0.5 respectively as disclosed in U.S. Pat. No. 4,188,472 to Chang, issued Feb. 12, 1980 and entitled "Curable Lactone Derived Resins". The HEMA ring opens the lactone and the two open chains then react with the diisocyanate to form a urethane diacrylate. The ethylenically unsaturated polyurethane free of urea linkages is usually present in amounts of from about 5 to about 50 percent by weight, preferably 10 to 40 percent by weight based on total weight of the composition.

The in-mold coating process comprises four steps, namely:

(a) placing on the outer surface of said article in a mold a charge of the curable thermosetting coating composition set forth above. The charge is sufficient to provide on said surface a coating having a thickness of less than about 20 mils.

(b) applying sufficient pressure to said charge to cause the coating composition to substantially and uniformly cover and penetrate said surface, (c) curing said coating composition in said mold under heat and pressure to bond said coating composition to said surface; and (d) removing said coated article from said mold, providing said article with a substantially smooth defect-free crosslinked polyurea-urethane based coating bonded to said surface of said article.

The claimed in-mold coating composition can be applied by the above process to any thermoset article, but it is particularly useful for coating fiber glass reinforced Sheet Molding Compounds, for example fiber glass reinforced unsaturated polyester based Sheet Molding Compound.

An amount of the in-mold coating composition is charged to a molded thermoset article in a mold such that it is applied in a thin layer, typically less than 20 mils, preferably from about 0.5 to about 10 mils. Once the mold is closed sufficient pressure is applied to cause the coating to substantially and uniformly cover and penetrate the article surface, generally, from about 50 psi to about 3000 psi. The in-mold coating is cured at a temperature of from about 50° C. to about 200° C. for about 15 seconds to 5 minutes and finally the mold opened and the coated article released. Articles coated in this manner exhibit excellent surface quality free of defects, good chip resistance, good adhesion of coating to substrate and good intercoat adhesion between the molded coating and subsequently applied coating compositions.

Besides use in in-mold coating compositions the dispersions of the present invention are useful in the formulation of injection molding compositions. In addition to the dispersion, the molding compositions contain a mold release agent and reinforcements.

The molding composition must be capable of being injected into a mold in a smooth even flow and cured therein. The dispersion medium for the injection molding composition is an ethylenically unsaturated monomer such as those mentioned above in connection with the preparation of the urea-urethane polymer dispersions. Suitable monomers include styrene, alpha-methyl styrene, vinyl toluene and methyl methacrylate. Preferably a vinyl aromatic compound such as styrene is used. The ethylenically unsaturated monomer is usually present in amounts of from 5 to 50 percent by weight based on total weight of the coating composition. The polymerizable ethylenically unsaturated urea-urethane polymer has been described in detail above thus no further discussion need be given here. The urea-urethane polymer is present in amounts of from about 10 percent to about 85 percent by weight, preferably 20 to 75 percent by weight based on the total weight of the composition.

Examples of mold release agents are those mentioned above in the description of the in-mold coating compositions. Preferably DuPont's aliphatic phosphate ZELEC UN is used. The mold release agent is used in amounts of from about 0.01 to about 5 percent by weight based on total weight of the coating composition.

The reinforcements are added to improve physical properties such as tensile strength, heat sag, and stiffness properties. Reinforcements can be of any conventional type and include fiberous reinforcements, non-fiberous reinforcements, and fillers. Useful fillers include calcium carbonate, clay, talc, and hydrated alumina. Useful non-fiberous reinforcements include hammer-mill glass flakes, suzorite mica, and wollastonite. Typically fiberous reinforcements such as glass fillers are utilized. The fibers are typically very short, generally ¼ inch or less and they comprise from about 0.5 percent to about 75 percent by weight, preferably 5 to 40 percent by weight based on the total weight of the composition. In a preferred embodiment fiber glass, particularly milled fiber glass is utilized to reinforce the molding composition. Other fiberous materials such as graphite fiber can also be used.

In a preferred embodiment the injection molding composition of the present invention additionally contains an ethylenically unsaturated polyurethane which is free of urea linkages and which is formed from reacting an organic polyisocyanate with an active hydrogen containing unsaturated compound. Examples of suitable polyisocyanates and active hydrogen containing ethylenically unsaturated compounds include those mentioned above in connection with the preparation of the urea-urethane polymers. This ethylenically unsaturated urethane is a crosslinker which stiffens the resultant molding. As a result the flexural modulus and heat distortion temperature are improved. When used it is used in amounts of from about 1 percent to about 50 percent by weight, preferably 5 to 30 percent by weight based on total weight of the composition.

Other optional components included in the claimed injection molding composition include free radical generating catalyst which has been discussed above and surfactant such as a silicone surfactant. When used these ingredients are used in amounts of about 0.1 to 5 percent by weight based on total weight of the composition.

The present invention also relates to a method of providing an injection molded completely cured thermoset article. For injection molding, in general, either a thermoplastic or thermosetting resin based molding composition is forced under pressure from a heated chamber through a feeding channel into the cavity of an injection mold. The mold is closed and the composition is solidified into a molded article.

The process of molding comprises the following steps:
(a) depending in a mold a charge of a thermosetting molding composition such as set forth above;
(b) heating the charge while in the mold so as to cure it and form a thermoset article; and
(c) removing the article from the mold.

The amount of molding composition charged to the mold must be sufficient to substantially fill the mold. The mold is closed and sufficient heat is applied to solidify the molding composition into cured article, generally from about 50° C. to about 200° C., preferably 75° C. to 185° C. are utilized. The resultant molded article has an integrally molded outer surface shaped in the reverse image of the mold. The articles molded in this manner have excellent surface quality and exhibit excellent adhesion to applied coating compositions.

Because of the desirable viscosity and thixotropy characteristics of the urea-urethane polymers they are very useful in injection molding in which the molding composition is deposited in the mold by forcing it under pressure from a reservoir through a feeding channel into the cavity of the mold. For use in injection molding, the molding compositions preferably have a viscosity of about 25,000 to 350,000 centipoises (measured at 25° C.) and lack substantial thixotropy.

Besides injection molding, the compositions of the invention can also be used in conventional compression molding where high viscosity can be tolerated. In compression molding both heat and pressure are used in the molding. Typical pressures utilized range from about 50 to 3000 psi.

Although the invention has been described with specific references and specific details of embodiments thereof, it is to be understood that it is not intended to be so limited since changes and alterations therein may be made by those skilled in the art which are within the full intended scope of this invention as defined by the appended claims.

Example I

| Charge | Reactants | Parts by Weight (grams) |
|---|---|---|
| A | isophorone diisocyanate | 495 |
|   | methyl methacrylate | 1078 |
|   | methyl quinone | 0.3 |
|   | IONOL[1] | 1 |
| B | POLYMEG 1000[2] | 1320 |
|   | isophoronediamine | 75 |
| C | dibutyltin dilaurate | 3 |
| D | methyl methacrylate | 924 |
| E | 2-hydroxyethyl acrylate | 112 |

[1] 2,6-di-tertiary butyl para-cresol available from Shell Chemical Company.
[2] Polytetramethylene ether glycol having a molecular weight of 1000 available from Quaker Oats Company (hereinafter referred to as polybutylene glycol).

A reactor was charged with (A), while stirring. Subsequently, (B) was added over a one hour period at 25° C.–30° C. followed by heating to 60° C.–70° C. The reaction mixture was held at this temperature for one hour followed by the addition of (C). The reaction mixture was held at 50° C.–60° C. for one-half hour and then (D) was added to bring the mixture to 50 percent methyl methacrylate content. Subsequently, (E) was added and the reaction mixture was heated until all NCO was reacted as determined by Infrared Spectroscopy. The resultant polyurea-polyurethane acrylate dispersion constituted about 50 percent polymer in about 50 percent methyl methacrylate. Brookfield viscosity determinations with number 3 spindle at 2 and 20 RPM yielded viscosities of 4750 and 4650 centipoises, respectively.

Example II

| Charge | Reactants | Parts by Weight (grams) |
|---|---|---|
| A | toluene diisocyanate | 2690 |
|   | methyl methacrylate | 6302 |

Example II-continued

| Charge | Reactants | Parts by Weight (grams) |
|---|---|---|
|  | methyl quinone | 2 |
|  | IONOL | 8 |
| B | 2-hydroxyethyl acrylate | 538 |
| C | POLYMEG 1000 | 7733 |
|  | isophoronediamine | 526 |
| D | dibutyltin dilaurate | 18 |
| E | POLYMEG 1000 | 619 |
|  | methyl methacrylate | 333 |
| E1 | POLYMEG 1000 | 309 |
|  | methyl methacrylate | 166 |
| F | 2-hydroxyethyl acrylate | 216 |

A reactor was charged with (A), while stirring. To this mixture (B) was added, at room temperature, while monitoring the temperature to ensure that it did not exceed 60° C. Subsequently, (C) was added over a one hour period at 25° C.–30° C. followed by heating to 60° C.–70° C. The reaction mixture was held at this temperature for one hour followed by the addition of (D). After one-half hour the NCO equivalent weight and Brookfield viscosity were determined. The viscosity value was less than 25,000 centipoises therefore additional polybutylene glycol and methyl methacrylate were added to adjust the viscosity. These additions, constituted charges E and E1. The viscosity value after the addition of E1 was 26,000 centipoises. End-capping was completed with the addition of F. The reaction mixture was then held at 60° C.–70° C. until all NCO was reacted as determined by Infrared Spectroscopy. The resultant polyurea-polyurethane acrylate acrylate dispersion constituted about 65 percent polymer in about 35 percent methyl methacrylate. The polymer had a weight average molecular weight of 16,400 as determined by gel permeation chromatography using a polystyrene standard (polymer dissolved in dimethylformamide). Preferred polymers typically will have molecular weight determined by this procedure of 10,000 to 30,000. Brookfield viscosity determinations with number 6 spindle at 2, 10, and 20 RPM yielded viscosities of 25,000; 25,000; and 23,000 centipoises, respectively.

Example III

| Charge | Reactants | Parts by Weight (grams) |
|---|---|---|
| A | toluene diisocyanate | 750 |
|  | methyl methacrylate | 1292 |
|  | methyl quinone | 0.3 |
|  | IONOL | 2 |
| B | 2-hydroxyethyl acrylate | 150 |
| C | CARBOWAX 600[1] | 1293 |
|  | isophoronediamine | 147 |
| D | dibutyltin dilaurate | 4 |
| E | CARBOWAX 600 | 52 |
|  | methyl methacrylate | 28 |
| E1 | CARBOWAX 600 | 52 |
|  | methyl methacrylate | 28 |
| E2 | CARBOWAX 600 | 52 |
|  | methyl methacrylate | 28 |
| E3 | CARBOWAX 600 | 52 |
|  | methyl methacrylate | 28 |
| F | 2-hydroxyethyl acrylate | 60 |

[1]Polyethylene glycol having a molecular weight of 600 available from Union Carbide A reactor was charged with (A) at room temperature, with stirring. To this mixture was added (B) at room temperature. Subsequently, (C) was added over a one hour period at 25° C.–30° C. followed by heating to 60° C.–70° C. The reaction mixture was held at this temperature for one hour followed by the addition of (D). After one-half hour the NCO equivalent weight and Brookfield viscosity were determined. The viscosity value was 1300 centipoises therefore additional polyethylene glycol and methyl methacrylate were added to adjust the viscosity. These additions constituted charges (E), (E1), (E2), and (E3). The viscosity value after the addition of E3 was 10,200 and end-capping was completed with the addition of F. The reaction mixture was then held at 60° C.–70° C. until all NCO was reacted as determined by Infrared Spectroscopy. The resultant polyurea-polyurethane acrylate dispersion constituted 65 percent polymer in about 35 percent methyl methacrylate. Brookfield viscosity determinations with number 5 spindle at 2, 10 and 20 RPM yielded viscosities of 7,000; 7,600; and 7,200, respectively.

Example IV

| Charge | Reactants | Parts by Weight (grams) |
|---|---|---|
| A | toluene diisocyanate | 552 |
|  | butyl methacrylate | 2292 |
|  | methyl quinone | 0.4 |
|  | IONOL | 2 |
| B | 2-hydroxyethyl acrylate | 110 |
| C | POLYMEG 1000 | 1586 |
|  | isophoronediamine | 108 |
| D | dibutyltin dilaurate | 4 |
| E | POLYMEG 1000 | 200 |
|  | butyl methacrylate | 108 |
| F | 2-hydroxyethyl acrylate | 44 |

A reactor was charged with (A), while stirring. To this mixture was added (B) at room temperature. Subsequently, (C) was added over a one hour period at 25° C.–30° C. followed by heating to 60° C.–70° C. The reaction mixture was held at this temperature for one hour followed by the addition of (D). After one-half hour the NCO equivalent weight and Brookfield viscosity were determined. The viscosity value was less than 25,000 centipoises and additional polybutylene glycol and butyl methacrylate were added to adjust the viscosity. This addition was charge E and after one-half hour the NCO equivalent weight and Brookfield viscosity were redetermined. The viscosity value was 60,000 centipoises and end-capping was completed with the addition of (F). The reaction mixture was held at 60° C.–70° C. until all NCO was reacted as determined by Infrared Spectroscopy. The resultant polyurea-polyurethane acrylate dispersion constituted about 65 percent polymer in about 35 percent butyl methacrylate. Brookfield viscosity determinations with number 7 spindle at 2, 10, and 20 RPM yielded viscosities of 50,000; 48,000; and 50,000, respectively.

Example V

| Charge | Reactants | Parts by Weight (grams) |
|---|---|---|
| A | toluene diisocyanate | 618 |
|  | methyl methacrylate | 1292 |
|  | methyl quinone | 0.4 |
|  | IONOL | 1 |
| B | 2-hydroxyethyl acrylate | 88 |
| C | CARBOWAX 600 | 1065 |
|  | POLYMEG 1000 | 507 |
|  | isophoronediamine | 86 |
| D | dibutyltin dilaurate | 37 |
| E | CARBOWAX 600 | 30 |
|  | methyl methacrylate | 16 |
| E1 | CARBOWAX 600 | 30 |
|  | methyl methacrylate | 16 |
| E2 | CARBOWAX 600 | 30 |
|  | methyl methacrylate | 16 |

Example V-continued

| Charge | Reactants | Parts by Weight (grams) |
| --- | --- | --- |
| F | 2-hydroxyethyl acrylate | 36 |

A reactor was charged with (A) at room temperature, while stirring. To this mixture was added (B) at room temperature. Subsequently, (C) was added over a one hour period at 25° C.–30° C. followed by heating to 60° C.–70° C. The reaction mixture was held at this temperature for one hour followed by the addition of (D). After one-half hour the NCO equivalent weight and Brookfield viscosity were determined. The viscosity value was 3100 centipoises and additional polyethylene glycol and methyl methacrylate were added to adjust the viscosity. These additions constituted charges (E), (E1), and (E2). The viscosity after the addition of E2 was 16,100 centipoises. End-capping was completed with the addition of (F). The reaction mixture was then held at 60° C.–70° C. until all NCO was reacted as determined by Infrared Spectroscopy. The resultant polyurea-polyurethane acrylate dispersion constituted 65 percent polymer in 35 percent methyl methacrylate. Brookfield viscosity determinations with number 5 spindle at 2, 10, and 20 RPM yielded viscosities of 14,000; 14,400; and 14,350, respectively.

Example VI

| Charge | Reactants | Parts by Weight (grams) |
| --- | --- | --- |
| A | toluene diisocyanate | 504 |
|   | methyl methacrylate | 1292 |
|   | methyl quinone | 0.4 |
|   | IONOL | 1 |
| B | 2-hydroxyethyl acrylate | 101 |
| C | POLYMEG 1000 | 1737 |
|   | ethylene diamine | 17 |
| D | dibutyltin dilaurate | 37 |
| E | POLYMEG 1000 | 116 |
|   | methyl methacrylate | 62 |
| F | POLYMEG 1000 | 58 |
|   | methyl methacrylate | 31 |
| G | 2-hydroxyethyl acrylate | 41 |

A reactor was charged with (A) at room temperature, while stirring. To this mixture was added (B) at room temperature. Subsequently, (C) was added over a one hour period at 25° C.–30° C. followed by heating to 60° C.–70° C. The reaction mixture was held at this temperature for one hour followed by the addition of (D). After one-half hour the NCO equivalent weight and Brookfield viscosity were determined. The viscosity value was 9000 centipoises and additional polyethylene glycol and methyl methacrylate were added to adjust the viscosity. These additions constituted charges (E) and (F). The viscosity after the addition of (F) was 22,000 centipoises. End-capping was completed with the addition of (G). The reaction mixture was then held at 60° C.–70° C. until all NCO was reacted as determined by Infrared Spectroscopy. The resultant polyurea-polyurethane acrylate dispersion constituted 65 percent polymer in 35 percent methyl methacrylate. Brookfield viscosity determinations with number 7 spindle at 2, 10, and 20 RPM yielded viscosities of 190,000; 104,000; and 82,000, respectively.

EXAMPLE VII

Part I

Part I of this example illustrates the preparation of an in-mold coating composition using as the base resin polyurea-polyurethane acrylate dispersion prepared in the manner taught by the previous examples.

| Reactants | Parts by Weight (grams) |
| --- | --- |
| Polyurea-polyurethane acrylate resin dispersion[1] | 22 |
| Flexible crosslinker[2] | 22 |
| Styrene | 9 |
| Calcium Carbonate | 44 |
| Mold Release Agent[3] | 0.14 |
| Catalyst Promoter[4] | 0.11 |
| Carbon Black | 3 |

[1]This dispersion was prepared in the manner taught by Example I from toluene diisocyanate, isophoronediamine, polypropylene glycol and 2-hydroxyethyl acrylate at 65 percent polymer in 35 percent styrene.
[2]Urethane diacrylate of hydroxyethyl methacrylate/epsilon-caprolactone adduct. This diacrylate has the following composition: hydroxyethyl methacrylate, epsilon-caprolactone and toluene diisocyanate at a mole ratio of 1:3:0.5, respectively.
[3]ZELEC UN available from DuPont.
[4]Cobalt octoate, available from Mooney Chemical.

To prepare the in-mold coating composition, a carbon black paste concentrate was initially prepared in the urethane diacrylate flexibilizer and one half of the styrene. The paste was milled to a Hegman grind of 6+ followed by the addition of the polyurea-polyurethane acrylate dispersion resin. Calcium carbonate was milled into the mixture followed by the addition of the ZELEC UN mold release agent and the promoter. The remainder of the styrene was used for washing the equipment once the composition was prepared.

Part II

Part II of this example illustrates the use of the in-mold coating composition prepared in Part I to coat an article which was compression molded from a sheet molding compound.

Initially, the in-mold coating composition prepared in Part I was catalyzed by mixing together 100 grams of the in-mold coating composition and 1.8 grams of tertiary butyl perbenzoate catalyst. (This coating composition is stable for over 14 days at 25° C. or over one hour at 80° C.) Subsequently, 450 grams of fiber glass reinforced unsaturated polyester-based Sheet Molding Compound (SMC) was charged to a 12 inch × 12 inch plaque mold which was preheated to a temperature within the range 145° C. to 155° C. The mold was pressured to about 1000 psi and the Sheet Molding Compound was molded and cured into a 0.125 inch plaque in about 90 seconds. Subsequently, the mold was opened and about 30 grams of catalyzed in-mold coating composition was charged onto the plaque's surface. The mold was closed and repressured, the coating composition covered the plaque surface in a 3 to 5 mil film, and finally was cured in about one minute. The mold was reopened and a SMC article with a conductive, porosity-free surface was removed. The in-mold coating composition utilized in this example exhibited excellent adhesion to all SMC substrates tested, good chip resistance and enough conductivity to be coated with electrostatically applied coatings. Intercoat adhesion between the molded coating and subsequently applied coating compositions was excellent.

EXAMPLE VIII

Part I

Part I of the example illustrates the preparation of an injection molding composition using as the base resin polyurea-polyurethane acrylate dispersion prepared in the manner taught by the previous examples.

| Reactants | Parts by Weight |
|---|---|
| Polyurea-polyurethane, acrylate resin dispersion of Example II | 72 |
| Crosslinker[1] | 27 |
| Catalyst[2] | 1 |
| Silicone surfactant[3] | 1 |
| MONDUR MR[4] | 0.4 |
| Mold release agent[5] | 0.4 |
| MFG ⅛ inch[6] | 37 |

[1] An ethylenically unsaturated polyurethane diacrylate free of urea linkages and formed by reacting the following ingredients:

| Charge | Reactants | Parts by Weight (grams) |
|---|---|---|
| A | MONDUR MR | 6944 |
| | Dibutyltin dilaurate | 9 |
| | Silicone surfactant | 2 |
| | Methyl quinone | 2 |
| | IONOL | 8 |
| B | 2-hydroxyethyl methacrylate | 7466 |
| C | Styrene | 3600 |

A twenty-two liter reactor was charged with (A) and part of (B) followed by the addition of (C) in two 1800 gram additions, about ten minutes apart. The remainder of (B) was added and the mixture was heated to 60° C.-70° C., slowly for about five hours and then allowed to cool. The resultant polyurethane had a viscosity of $Z^3$. Infrared spectroscopy revealed the absence of isocyanate groups.
[2] 1,1-di-tertiary butylperoxy 3,3,5-trimethylcyclohexane.
[3] Available from Union Carbide as UC 31995.
[4] Crude methylene diphenyl diisocyanate available from Mobay Chemical Corp.
[5] ZELEC UN available from DuPont.
[6] Milled fiber glass passed through a ⅛ inch screen.

The injection molding composition was prepared as follows. A mixing vessel equipped with a rotary mixing blade was charged with polyurea-polyurethane acrylate resin dispersion, crosslinker, catalyst, silicone surfactant and mold release agent and the charge blended until homogenous. As the aforesaid mixture was stirred the MONDUR MR and milled fiber glass were added followed by additional stirring until the mixture was uniform. Subsequently, the mixture was allowed to stir for an additional period enabling air to be dispersed within it.

Part II

Part II of this example illustrates the use of the injection molding composition of Part I for injection molding.

The molding composition was processed on an Accuratio Reaction Injection Molding Machine VR-75. This machine is a two pot system designed to process polyols and isocyanates as in polyurethane molding. Since the molding composition of this example is a one component composition only one side of the Reaction Injection Machine was charged while one side was blocked off.

The molding composition was charged into an air pressurized tank and the system purged of air and solvent by recirculation through a detached line until clear. The injection head was bolted to an aluminum RIM test plaque mold installed in a 30 ton vertical hydraulic press and electrically heated to 105° C.±5° C. The machine dispensed about 300 grams of the molding mix to fill a 12 inch × 12 inch × ⅛ inch mold. The composition was cured for one minute at about 110° C. Surface quality of the cured plaques was Class A and was immediately paintable with excellent paint adhesion. The chart below lists some typical physical properties of the aforesaid injection molded compositions.

| | |
|---|---|
| Tensile Strength × $10^3$ psi | 2.14 |
| Tensile Modulus × $10^5$ psi | 1.93 |
| Flexural Strength Parallel to Flow × $10^3$ psi | 3.71 |
| Flexural Modulus Parallel to Flow × $10^5$ psi | 2.25 |
| Flexural Strength Perpendicular to Flow × $10^3$ psi | 3.07 |
| Flexural Modulus Perpendicular to Flow × $10^5$ psi | 1.48 |
| Notched Izod ft lbs/in | 1.38 |
| Percent Elongation | 20.9 |
| Heat Distortion Temperature (264 psi) | 125° |
| Linear Coefficient of Thermal Expansion Parallel to Flow IN/IN/°F. × $10^6$ | 29.7 |
| Heat Sag 6 inches at 121° C. for 30 minutes Parallel to Flow (in inches) | 0.17 |
| Heat Sag 6 inches at 121° C. for 30 minutes Perpendicular to Flow (in inches) | 0.55 |

What is claimed is:

1. A process for preparing a polymerizable ethylenically unsaturated urea-urethane polymer dispersed in a polymerizable ethylenically unsaturated compound, which comprises reacting a polyisocyanate, at least a portion of which is a diisocyanate, with a polyfunctional amine containing primary and/or secondary amino groups in the presence of:
   (a) a polyol, at least a portion of which is a polymeric polyol, free of ethylenic unsaturation,
   (b) a diluent which is an ethylenically unsaturated compound free of active hydrogens, and
   (c) an active hydrogen-containing polymerizable ethylenically unsaturated compound, the equivalent ratio of isocyanate to active hydrogen in said polyol and said polyfunctional amine being within the range of 1.1 to 2.0/1 and the equivalent ratio of polyol to polyfunctional amine being within the range of 0.75 to 20/1,
   under conditions sufficient to form a polymerizable ethylenically unsaturated urea-urethane polymer dispersed in a polymerizable ethlenically unsaturated compound.

2. A process for preparing a polymerizable ethylenically unsaturated urea-urethane polymer dispersed in a polymerizable ethylenically unsaturated compound, which comprises the sequential steps of:
   (a) reacting a polyisocyanate, at least a portion of which is a diisocyanate, with a polyfunctional amine containing primary and/or secondary amino groups in the presence of a polyol, at least a portion of which is a polymeric polyol, free of ethylenic unsaturation and a diluent which is an ethylenically unsaturated compound free of active hydrogens, the equivalent ratio of isocyanate to active hydrogen in said polyol and said polyfunctional amine being within the range of 1.1 to 2.0/1 and the equivalent ratio of polyol to polyfunctional amine being within the range of 0.75 to 20/1, under conditions sufficient to form an NCO group-containing polyurea-polyurethane dispersed in an ethylenically unsaturated compound, followed by
   (b) reacting the NCO group-containing polyurea-polyurethane dispersion with an active hydrogen containing polymerizable ethylenically unsaturated compound under conditions sufficient to react the NCO-functionality with the active hydrogens thereby forming the polymerizable ethylenically unsaturated urea-urethane polymer dispersion.

3. The process of claim 1 or 2 wherein the ethylenic unsaturation in the polymerizable ethylenically unsaturated urea-urethane polymer is in the terminal position.

4. The process of claim 2 wherein the polyfunctional amine and polyol are premixed before being contacted with the polyisocyanate.

5. The process of claim 1 or 2 wherein the organic polyisocyanate is selected from the group consisting of aliphatic polyisocyanates and aromatic polyisocyanates.

6. The process of claim 5 wherein the organic polyisocyanate is a diisocyanate.

7. The process of claim 1 or 2 wherein the polyol is a diol.

8. The process of claim 7 wherein the diol is selected from the group consisting of polyether diols, polyester diols both of which have a molecular weight of 500 or more and mixtures of said polyether diols or polyester diols with diols having a molecular weight of 250 or less.

9. The process of claim 8 wherein the diol is a polyether diol.

10. The process of claim 8 wherein the diol is a polyester diol.

11. The process of claim 8 wherein the diol is a mixture of a polyether diol or a polyester diol, both of which have a molecular weight of 500 or more, with a diol having a molecular weight of 250 or less.

12. The process of claim 1 or 2 wherein the active hydrogen-containing ethylenically unsaturated compound is a hydroxyalkyl acrylate or methacrylate.

13. A process of claim 1 wherein the ethylenically unsaturated compound free of active hydrogens is selected from the group consisting of vinyl aromatic compounds and alkyl acrylates or methacrylates.

14. The process of claim 1 or 2 wherein the polyfunctional amine is a diamine.

15. The process of claim 14 wherein the diamine is a cyclic diamine.

16. The process of claim 15 wherein the diamine is isophoronediamine.

17. The process of claim 2 wherein a portion of the active hydrogen-containing polymerizable ethylenically unsaturated compound is present in Step (a).

18. The process of claim 17 wherein a portion of the diol is present in Step (b).

19. A polymerizable ethylenically unsaturated urea-urethane polymer dispersed in a polymerizable ethylenically unsaturated compound prepared by a process, which comprises
(a) reacting a polyisocyanate, at least a portion of which is a diisocyanate, with a polyfunctional amine containing primary and/or secondary amino groups in the presence of a polyol, at least a portion of which is a polymeric polyol, free of ethylenic unsaturation and a diluent which is an ethylenically unsaturated compound free of active hydrogens, the equivalent ratio of isocyanate to active hydrogen in said polyol and said polyfunctional amine being within the range of 1.1 to 2.0/1 and the equivalent ratio of polyol to polyfunctional amine being within the range of 0.75 to 20/1, under conditions sufficient to form an NCO group-containing polyurea-polyurethane dispersed in an ethylenically unsaturated compound; followed by
(b) reacting the NCO group-containing polyurea-polyurethane dispersion with an active hydrogen containing polymerizable ethylenically unsaturated compound under conditions sufficient to react the NCO-functionality with the active hydrogens thereby forming the polymerizable ethylenically unsaturated urea-urethane polymer dispersion.

20. An in-mold coating composition, which comprises a dispersion of the following ingredients in an ethylenically unsaturated monomer:
(a) a polymerizable ethylenically unsaturated urea-urethane polymer prepared by a process, which comprises:
(i) reacting a polyisocyanate, at least a portion of which is a diisocyanate, with a polyfunctional amine containing primary and/or secondary amino groups in the presence of a polyol, at least a portion of which is a polymeric polyol, free of ethylenic unsaturation and a diluent which is an ethylenically unsaturated compound free of active hydrogens, the equivalent ratio of isocyanate to active hydrogen in said polyol and said polyfunctional amine being within the range of 1.1 to 2.0/1 and the equivalent ratio of polyol to polyfunctional amine being within the range of 0.75 to 20/1, under conditions sufficient to form an NCO group-containing polyurea-polyurethane dispersed in an ethylenically unsaturated compound; followed by
(ii) reacting the NCO group-containing polyurea-polyurethane dispersion with an active hydrogen containing polymerizable ethylenically unsaturated compound under conditions sufficient to react the NCO-functionality with the active hydrogens thereby forming the polymerizable ethylenically unsaturated urea-urethane polymer dispersion.
(b) a catalyst, and
(c) a mold release agent;
said coating composition capable of being applied to the outer surface of a molded article while still in the mold such that when the mold is closed and sufficient pressure applied the coating composition substantially and uniformly covers and penetrates the article surface.

21. The composition of claim 20 wherein it additionally contains a pigment.

22. The coating composition of claim 20 wherein the ethylenic unsaturation in the polymerizable ethylenically unsaturated urea-urethane polymer is in the terminal position.

23. The coating composition of claim 20 wherein it contains as an additional ingredient an ethylenically unsaturated polyurethane free of urea linkages.

24. The coating composition of claim 20 wherein the catalyst is a free radical generating catalyst.

25. The coating composition of claim 21 wherein the pigment is an electroconductive pigment.

26. The coating composition of claim 20 wherein the ethylenically unsaturated monomer is a vinyl aromatic compound.

27. The coating composition of claim 20 in which the mold release agent is a phosphate ester.

28. The coating composition of claim 24 in which
(a) the polymerizable ethylenically unsaturated urea-urethane polymer is present in amounts of from about 5 to about 50 percent by weight,
(b) the catalyst is present in amounts of from about 0.5 to about 3 percent by weight, and
(c) the mold release agent is present in amounts of from about 0.01 to about 5 percent by weight;

the percentages by weight being based on total weight of the composition.

29. An injection molding composition, which comprises a dispersion of the following ingredients in an ethylenically unsaturated monomer:
   (a) a polymerizable ethylenically unsaturated urea-urethane polymer prepared by a process, which comprises:
      (i) reacting a polyisocyanate, at least a portion of which is a diisocyanate, with a polyfunctional amine containing primary and/or secondary amino groups in the presence of a polyol, at least a portion of which is a polymeric polyol, free of ethylenic unsaturation and a diluent which is an ethylenically unsaturated compound free of active hydrogens, the equivalent ratio of isocyanate to active hydrogen in said polyol and said polyfunctional amine being within the range of 1.1 to 2.0/1 and the equivalent ratio of polyol to polyfunctional amine being within the range of 0.75 to 20/1, under conditions sufficient to form an NCO group-containing polyurea-polyurethane dispersed in an ethylenically unsaturated compound; followed by
      (ii) reacting the NCO group-containing polyurea-polyurethane dispersion with an active hydrogen containing polymerizable ethylenically unsaturated compound under conditions sufficient to react the NCO-functionality with the active hydrogens thereby forming the polymerizable ethylenically unsaturated urea-urethane polymer dispersion.
   (b) a mold release agent, and
   (c) reinforcements;
said molding composition capable of being injected into a mold in a smooth even flow and cured therein.

30. The composition of claim 29 wherein the reinforcements are fillers.

31. The molding composition of claim 29 wherein the ethylenic unsaturation in the polymerizable ethylenically unsaturated urea-urethane polymer is in the terminal position.

32. The molding composition of claim 29 wherein it contains as an additional ingredient an ethylenically unsaturated polyurethane which is free of urea linkages and which is formed from reacting an organic polyisocyanate with an active hydrogen-containing unsaturated compound.

33. The molding composition of claim 29 which contains a free radical generating catalyst.

34. The molding composition of claim 29 which contains a surfactant.

35. The molding composition of claim 29 in which the ethylenically unsaturated monomer comprises at least in part a vinyl aromatic compound.

36. The molding composition of claim 29 in which the mold release agent is a phosphate ester.

37. The molding composition of claim 29 in which the reinforcement is fibrous.

38. The molding composition of claim 37 wherein the fibrous reinforcement is milled fiber glass.

39. The molding composition of claim 37 in which
   (a) the polymerizable ethylenically unsaturated urea-urethane polymer is present in amounts of from about 10 to about 85 percent by weight,
   (b) the mold release agent is present in amounts of from about 0.01 to about 5 percent by weight, and
   (c) the fibrous reinforcement is present in amounts of from about 0.5 to about 75 percent by weight;
the percentage by weight being based on the total weight of the molding composition.

* * * * *